(12) United States Patent
Ho et al.

(10) Patent No.: US 10,835,847 B2
(45) Date of Patent: Nov. 17, 2020

(54) POLYMERIC MEMBRANES FOR SEPARATION OF GASES

(71) Applicant: OHIO STATE INNOVATION FOUNDATION, Columbus, OH (US)

(72) Inventors: W.S. Winston Ho, Columbus, OH (US); Yuanxin Chen, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 135 days.

(21) Appl. No.: 15/577,954

(22) PCT Filed: May 31, 2016

(86) PCT No.: PCT/US2016/035035
§ 371 (c)(1),
(2) Date: Nov. 29, 2017

(87) PCT Pub. No.: WO2016/196474
PCT Pub. Date: Dec. 8, 2016

(65) Prior Publication Data
US 2018/0147513 A1    May 31, 2018

Related U.S. Application Data

(60) Provisional application No. 62/168,410, filed on May 29, 2015.

(51) Int. Cl.
*B01D 39/16* (2006.01)
*B01D 69/14* (2006.01)
(Continued)

(52) U.S. Cl.
CPC ..... *B01D 39/1623* (2013.01); *B01D 39/1692* (2013.01); *B01D 69/142* (2013.01);
(Continued)

(58) Field of Classification Search
CPC ............ B01D 39/1623; B01D 39/1692; B01D 69/10; B01D 69/12; B01D 69/142;
(Continued)

(56) References Cited

U.S. PATENT DOCUMENTS 5,611,843 A    3/1997 Ho
6,099,621 A    8/2000 Ho
(Continued)

FOREIGN PATENT DOCUMENTS

CN    1638850 A    7/2005
EP    0465697 A1    1/1992

OTHER PUBLICATIONS

Li, Fabrication of dual-layer polyethersulfone (PES) hollow fiber membranes with an ultrathin dense-selective layer for gas separation, Journal of Membrane Science, vol. 245, pp. 53-60 (Year: 2004).*

(Continued)

*Primary Examiner* — Robert Clemente
(74) *Attorney, Agent, or Firm* — Meunier Carlin & Curfman LLC

(57) ABSTRACT

Membranes, methods of making the membranes, and methods of using the membranes are described herein. The membranes can comprise a gas permeable support layer, optionally an inorganic layer disposed on the support, and a selective polymer layer disposed on the inorganic layer. In some cases, the selective polymer layer can comprise an amine-containing polymer and an amino acid salt dispersed within the amine-containing polymer. In other cases, the selective polymer layer comprises a sterically hindered amine-containing polymer, such as a sterically hindered derivative of polyvinylamine. The membranes can be used, for example, to separate gaseous mixtures, such as flue gas.

19 Claims, 1 Drawing Sheet

(51) Int. Cl.
  B01D 69/12 (2006.01)
  B01D 69/10 (2006.01)
  B01D 53/22 (2006.01)
  B01D 71/44 (2006.01)

(52) U.S. Cl.
  CPC .......... B01D 69/148 (2013.01); *B01D 53/228* (2013.01); *B01D 69/10* (2013.01); *B01D 69/12* (2013.01); *B01D 71/44* (2013.01); *B01D 2239/0654* (2013.01)

(58) Field of Classification Search
  CPC .... B01D 69/148; B01D 53/228; B01D 71/44; B01D 2239/0654
  See application file for complete search history.

(56) References Cited

U.S. PATENT DOCUMENTS

2005/0070193 A1   3/2005   Hennige et al.
2005/0087491 A1   4/2005   Hennige et al.

OTHER PUBLICATIONS

J. Zou, W. S. W. Ho, CO2selective polymeric membranes containing amines in crosslinked poly(vinyl alcohol), J. Membr. Sci. 286 (2006) 310-321.
J. Huang, J. Zou, W. S. W. Ho, Carbon dioxide capture using a CO2selective facilitated transport membrane, Ind. Eng. Chem. Res. 47 (2008) 1261-1267.
Y. Zhao, W. S. W. Ho, CO2selective membranes containing sterically hindered amines for CO2/H2 separation, Ind. Eng. Chem. Res. 52 (2013) 8774-8782.
Y. Zhao, B. T. Jung, L. Ansaloni, W. S. W. Ho, Multiwalled carbon nanotube mixed matrix membranes containing amines for high pressure CO2/H2 separation, J. Membr. Sci. 459 (2014) 233-243.
H. Matsuyama, A. Terada, T. Nakagawara, Y. Kitamura, M. Teramoto, Facilitated transport of CO2 through polyethylenimine/poly(vinyl alcohol) blend membrane, J. Membr. Sci. 163 (1999) 221-227.
T.J. Kim, B. Li, M.B. Hägg, Novel fixedsitecarrier polyvinylamine membrane for carbon dioxide capture, J. Poly. Sci. Part B: Poly. Phys. 42 (2004) 4326-4336.
L. Deng, T.J. Kim, M.B. Hägg, Facilitated transport of CO2 in novel PVAm/PVA blend membrane, J. Membr. Sci. 340 (2009) 154-163.
Z. Qiao, Z. Wang, C. Zhang, S. Yuan, Y. Zhu, J. Wang, PVAmPIP/PS composite membrane with high performance for CO2/N2 separation, AIChE Journal 59 (2013) 215-228.
S. Yuan, Z. Wang, Z. Qiao, M. Wang, J. Wang, S. Wang, Improvement of CO2/N2 separation characteristics of polyvinylamine by modifying with ethylenediamine, J. Membr. Sci. 378 (2011) 425-437.
O. H. LeBlanc, W. J. Ward, S. L. Matson, S. G.Kimura, Facilitated transport in ionexchange membranes, J. Membr. Sci. 6 (1980) 339-343.
H. Matsuyama, M. Teramoto, H. Sakakura, K. Iwai, Facilitated transport of CO2 through various ion exchange membranes prepared by plasma graft polymerization, J. Membr. Sci. 117 (1996) 251-260.
R. Yegani, H. Hirozawa, M. Teramoto, H. Himei, O. Okada, T. Takigawa, N. Ohmura, N. Matsumiya, H. Matsuyama, Selective separation of CO2 by using novel facilitated transport membrane at elevated temperatures and pressures, J. Membr. Sci. 291 (2007) 157-164.
Y.S. Kim, S.M. Yang, Absorption of carbon dioxide through hollow fiber membranes using various aqueous absorbents, Sep. Purif. Technol. 21 (2000) 101-109.
G. J. Francisco, A. Chakma, X. Feng, Membranes comprising of alkanolamines incorporated into poly(vinyl alcohol) matrix for CO2/N2 separation. J. Membr. Sci. 303 (2007) 54-63.
Li et al., Fabrication of dual-layer polyethersulfone (PES) hollow fiber membranes with an ultrathin dense-selective layer for gas separation. Journal of Membrane Science 245 (2004) 53-60.
International Search Report and Written Opinion issued for International Application No. PCT/US2016/035035, dated Oct. 11, 2016.
International Preliminary Report on Patentability issued for International Application No. PCT/US2016/035035, dated Dec. 5, 2017.
L.M. Robeson, B.D. Freeman, D.R. Paul, B.W. Rowe, An empirical correlation of gas 15 permeability and permselectivity in polymers and its theoretical basis, J. Membr. Sci. 341 (2009) 178-185.
D.E. Gottschlich, D.L. Roberts, J.D. Way, A theoretical comparison of facilitated transport and solution-diffusion membrane modules for gas separation, Gas Sep. Purif. 2 (1988) 65-71.
Y. Zhao, W.S.W. Ho, Steric hindrance effect on amine demonstrated in solid polymer membranes for CO2 transport, J. Membr. Sci. 415-416 (2012) 132-138.
M. Caplow, Kinetics of carbamate formation and breakdown, J. Am. Chem. Soc. 90 (1968) 6795-6803.
P.V. Danckwerts, The reaction of CO2 with ethanolamines, Chem. Eng. Sci. 34 (1979) 443-446.
G. Sartori, W.S.W. Ho, D.W. Savage, G.R. Chludzinski, S. Wiechert, Sterically-hindered amines for acid-gas absorption, Sep. Purif. Methods 16 (1987) 171-200.
Office Action and search Report issued by the Chinese National Intellectual Property Administration in Chinese Application No. 201680039620.3 dated Sep. 17, 2019. 23 pages including English translation.

* cited by examiner

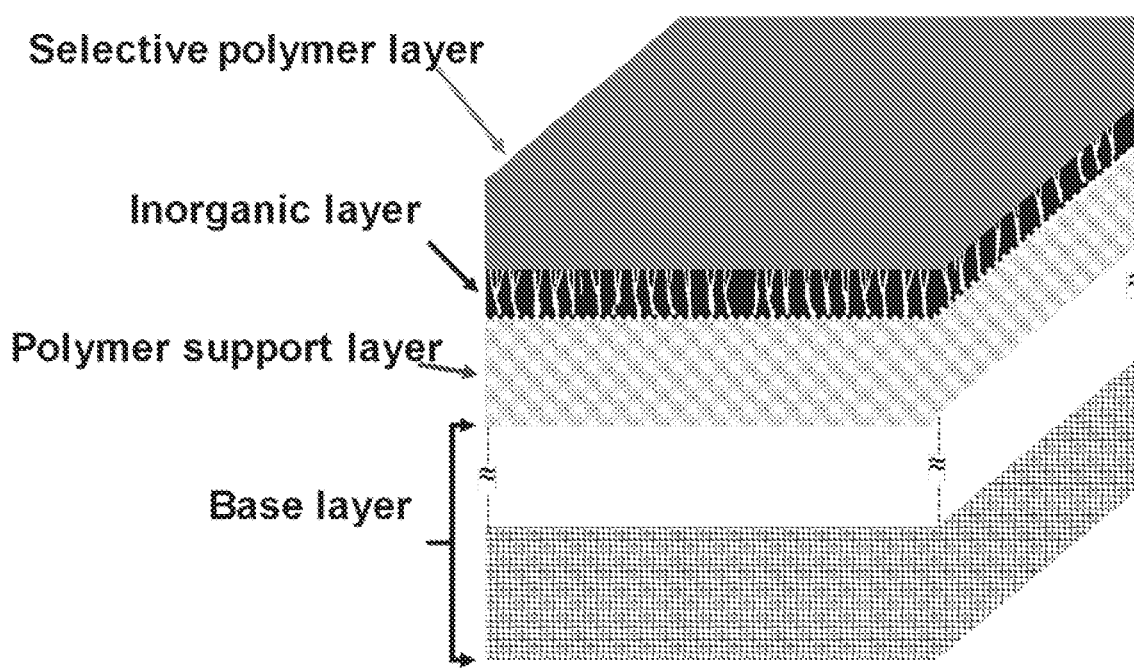

POLYMERIC MEMBRANES FOR SEPARATION OF GASES

CROSS REFERENCE TO RELATED APPLICATIONS

This application claims the benefit of U.S. Provisional Patent Application Ser. No. 62/168,410 filed May 29, 2015, the disclosure of which is expressly incorporated herein by reference.

STATEMENT REGARDING FEDERALLY SPONSORED RESEARCH OR DEVELOPMENT

This invention was made with Government Support under Grant Nos. DE-FE0007632 and DE-FE0026919 awarded by the U.S. Department of Energy, National Energy Technology Laboratory. The Government has certain rights in the invention.

FIELD OF THE DISCLOSURE

This disclosure relates generally to membrane structures, more particularly, to membrane structures for the separation of at least one gas from a gaseous mixture.

BACKGROUND OF THE DISCLOSURE

There are numerous industrial processes that produce gas streams containing carbon dioxide, hydrogen sulfide, hydrogen chloride, nitrogen oxide, and sulfur oxide. It is often desirable to remove one or more of these gases from the other components of the gas streams, such as hydrogen and nitrogen. Inorganic membranes have been employed for a variety of gas separation applications, including hydrogen purification and carbon dioxide sequestration. However, a major limiting factor to the application of inorganic membranes is the frequent occurrence of defects which limits reproducibility, stability, and the separation performance of the membranes. There remains a need in the art for membranes, methods of making membranes, and methods of separating gases.

SUMMARY OF THE DISCLOSURE

Membranes, methods of making the membranes, and methods of using the membranes are described herein. The membranes can comprise a gas permeable support layer, and a selective polymer layer disposed on the gas permeable support layer. In some cases, the selective polymer layer can comprise an amine-containing polymer and an amino acid salt dispersed within the amine-containing polymer. In some cases, the selective polymer layer can comprise a sterically hindered amine-containing polymer.

The gas permeable support layer can comprise a gas permeable polymer. The gas permeable polymer can be a polymer selected from the group consisting of polyamides, polyimides, polypyrrolones, polyesters, sulfone-based polymers, polymeric organosilicones, fluorinated polymers, polyolefins, copolymers thereof, and blends thereof. In some embodiments, the gas permeable polymer comprises polyethersulfone. In certain cases, the gas permeable support layer comprises a gas permeable polymer disposed on a base (e.g., a nonwoven fabric such as a polyester nonwoven).

In some embodiments, the selective polymer layer can comprise an amine-containing polymer and an amino acid salt dispersed within the amine-containing polymer. The amine-containing polymer can be, for example, polyvinylamine, polyallylamine polyethyleneimine, poly-N-isopropylallylamine, poly-N-tert-butylallylamine, poly-N-1,2-dimethylpropylallylamine, poly-N-1-methylpropylallylamine, poly-N-2-methylpropylallylamine, poly-N-1-ethylpropylallylamine, poly-N-2-ethylpropylallylamine, poly-N-methylallylamine, poly-N,N-dimethylallylamine, poly-N-ethylallylamine, poly-N,N-diethylallylamine, poly(N-methyl-N-vinylamine), poly(N-ethyl-N-vinylamine), poly(N-isopropyl-N-vinylamine), poly(N-tert-butyl-N-vinylamine), poly(N-propyl-N-vinylamine), poly(N,N-dimethyl-N-vinylamine), poly(N,N-diethyl-N-vinylamine), poly-2-vinylpiperidine, poly-4-vinylpiperidine, polyaminostyrene, chitosan, copolymers, and blends thereof.

The amine-containing polymer can be a high molecular weight amine-containing polymer. For example, the amine-containing polymer can have a weight average molecular weight of at least 500,000 Da (e.g., at least 700,000 Da, or at least 1,000,000 Da). In certain embodiments, the amine-containing polymer can have a weight average molecular weight of from 500,000 Da to 5,000,000 Da, or from 500,000 Da to 2,000,000 Da. The amine-containing polymer can be a modest molecular weight amine-containing polymer. For example, the amine-containing polymer can have a weight average molecular weight of at least 50,000 Da (e.g., at least 100,000 Da, or at least 500,000 Da). In certain embodiments, the amine-containing polymer can have a weight average molecular weight of from 50,000 Da to 500,000 Da.

In some cases, the amine-containing polymer can comprise polyvinylamine. In some cases, the amine-containing polymer can comprise a sterically hindered derivative of polyvinylamine. In some embodiments, the sterically hindered derivative of polyvinylamine comprises a polymer having the structure below.

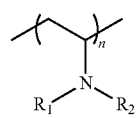

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a hetercyclic ring, with the proviso that at least one of $R_1$ and $R_2$ is not hydrogen; and n is an integer from 10 to 25,000. In some embodiments, the sterically hindered derivative of polyvinylamine comprises a random copolymer or block copolymer having the structure below

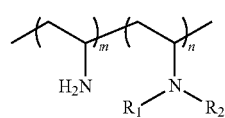

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a hetercyclic ring, with the proviso that at least one of $R_1$ and $R_2$ is not hydrogen; m is an integer from 10 to 10,000; and n is an integer from 10 to 10,000.

The amino acid salt can be a salt of any suitable amino acid. In some cases, the amino acid salt can comprise a salt of a compound defined by the formula below

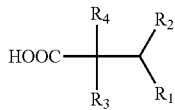

wherein, independently for each occurrence in the amino acid, each of $R_1$, $R_2$, $R_3$ and $R_4$ is selected from one of the following

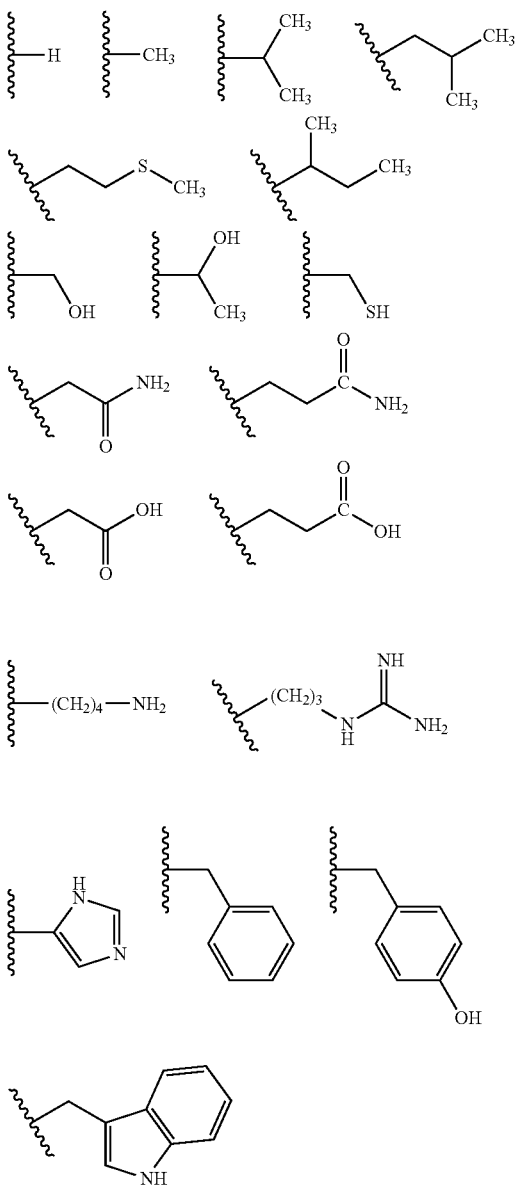

or $R_1$ and $R_3$, together with the atoms to which they are attached, form a five-membered heterocycle defined by the structure below when n is 1, or a six-membered heterocycle defined by the structure below when n is 2.

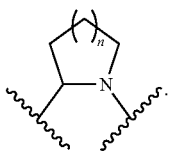

In certain embodiments, the amino acid salt can comprise a glycinate salt (e.g., sodium glycinate, potassium glycinate, lithium glycinate, or piperazine glycinate). In certain embodiments, the amino acid salt can comprise an aminoisobutyrate salt (e.g., aminoisobutyric acid-potassium salt, aminoisobutyric acid-lithium salt, or aminoisobutyric acid-piperazine salt). The selective polymer layer can comprise from 30% to 80% by weight amino acid salt, based on the total weight of the selective polymer layer.

In other embodiments, the selective polymer layer can comprise a sterically hindered amine-containing polymer. The sterically hindered amine-containing polymer can include a sterically hindered amine sidechain. Sterically hindered amine sidechains include either a primary amine that is attached to a tertiary carbon or a secondary amine that is attached to at least one secondary carbon or tertiary carbon. In some cases, the sterically hindered amine-containing polymer can comprise a sterically hindered derivative of polyvinylamine. In some embodiments, the sterically hindered derivative of polyvinylamine comprises a polymer having the structure below

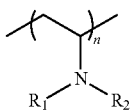

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a hetercyclic ring, with the proviso that at least one of $R_1$ and $R_2$ is not hydrogen; and n is an integer from 10 to 25,000. In some embodiments, the sterically hindered derivative of polyvinylamine comprises a random copolymer or block copolymer having the structure below

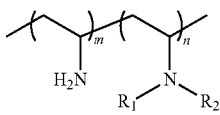

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a hetercyclic ring, with the proviso that at least one of $R_1$ and $R_2$ is not hydrogen; m is an integer from 10 to 10,000; and n is an integer from 10 to 10,000.

The sterically hindered amine-containing polymer can be a high molecular weight sterically hindered amine-containing polymer. For example, the sterically hindered amine-containing polymer can have a weight average molecular weight of at least 500,000 Da (e.g., at least 700,000 Da, or at least 1,000,000 Da). In certain embodiments, the sterically hindered amine-containing polymer can have a weight average molecular weight of from 500,000 Da to 5,000,000 Da, or from 500,000 Da to 2,000,000 Da. The sterically hindered amine-containing polymer can be a modest molecular weight amine-containing polymer. For example, the amine-containing polymer can have a weight average molecular weight of at least 50,000 Da (e.g., at least 100,000 Da, or at least 500,000 Da). In certain embodiments, the amine-containing polymer can have a weight average molecular weight of from 50,000 Da to 500,000 Da.

In these embodiments, the selective polymer layer can optionally further include a low molecular weight amino compound dispersed within the sterically hindered amine-containing polymer. The low molecular weight compound can have a molecular weight of less than 1,000 Da. The low molecular weight amino compound can be a salt of a primary amine or a salt of a secondary amine. In certain embodiments, the low molecular weight amino compound can comprise an amino acid salt. The amino acid salt can be a salt of any suitable amino acid. In some cases, the amino acid salt can comprise a salt of a compound defined by the formula below

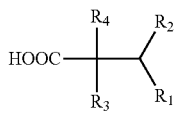

wherein, independently for each occurrence in the amino acid, each of $R_1$, $R_2$, $R_3$ and $R_4$ is selected from one of the following

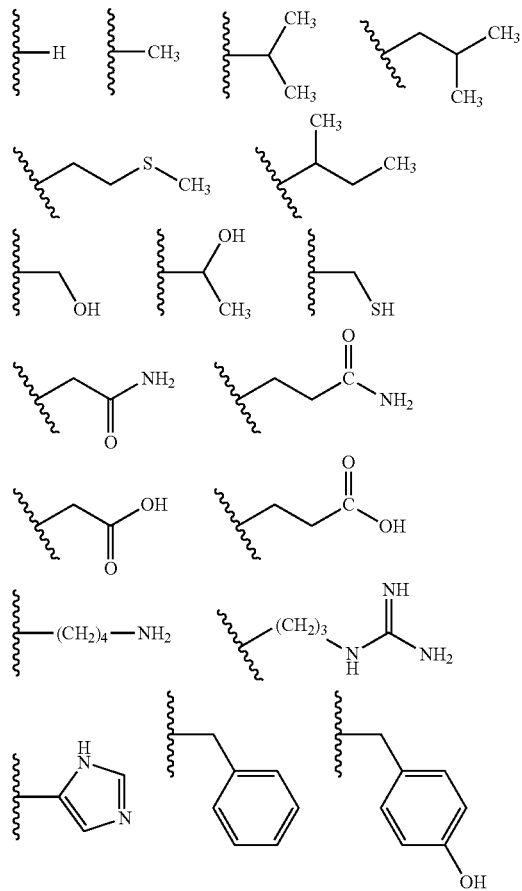

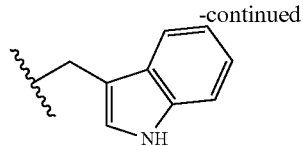

or $R_1$ and $R_3$, together with the atoms to which they are attached, form a five-membered heterocycle defined by the structure below when n is 1, or a six-membered heterocycle defined by the structure below when n is 2

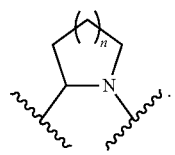

In certain embodiments, the amino acid salt can comprise a glycinate salt (e.g., sodium glycinate, potassium glycinate, lithium glycinate, or piperazine glycinate). The selective polymer layer can comprise from 30% to 80% by weight amino acid salt, based on the total weight of the selective polymer layer.

Optionally, the membranes can further comprise an inorganic layer. In these embodiments, the inorganic layer can be disposed on the gas permeable support layer, and the selective polymer layer can be disposed on the inorganic layer. The inorganic layer can comprise a plurality of discreet nanoparticles having an average particle size of less than 1 micron. The nanoparticles in the inorganic layer can comprise any suitable nanoparticles having an average particle size of less than 1 micron. The average particle size of the nanoparticles in the inorganic layer can be from 1 nm to 500 nm (e.g., from 1 nm to 250 nm). In some embodiments, the nanoparticles in the inorganic layer can comprise alkaline earth metal oxide nanoparticles, transition metal oxide nanoparticles, lanthanide metal oxide nanoparticles, group IVA metal oxide nanoparticles, transition metal nanoparticles, transition-metal catalyst nanoparticles, nanoparticles comprising a transition metal adsorbed on a non-reactive support, metal alloy nanoparticles, silicate nanoparticles, alumino-silicate nanoparticles, nanoparticles comprising clays, and combinations thereof. In certain embodiments, the nanoparticles in the inorganic layer can be chosen from silicate nanoparticles, alumino-silicate nanoparticles, or combinations thereof. In certain embodiments, the nanoparticles can comprise zeolite nanoparticles. The zeolite nanoparticles can have varying frameworks and differing Si/Al rations. For example, the nanoparticles can be zeolite Y nanoparticles.

The membranes can exhibit selective permeability to gases, including acidic gases. For example, the membranes can exhibit selective permeability to carbon dioxide, hydrogen sulfide, sulfur dioxide, sulfur trioxide, nitrogen oxide, hydrogen chloride, water, and combinations thereof. In some cases, the membranes can exhibit a $CO_2:N_2$ selectivity of from 30 to 500 (e.g., from 45 to 350, or from 75 to 350) at 57° C. and 1 atm feed pressure. The membranes can also exhibit a relatively high permeability to certain gases. For example, in some cases, the membranes can exhibit a $CO_2$ permeance of from 200 to 2000 GPU at 57° C. and 1 atm feed pressure.

Methods of making the membranes disclosed herein are also provided. Methods of making membranes can include depositing a nanoparticle dispersion on a gas permeable support layer to form an inorganic layer disposed on the gas permeable support layer. The nanoparticle dispersion can comprise a plurality of discreet nanoparticles having an average particle size of less than 1 micron in a suitable fluid carrier. In some embodiments, depositing the nanoparticle dispersion on the gas permeable support layer can comprise vacuum-assisted dip-deposition of the nanoparticle dispersion on the gas permeable support layer. Methods can further include coating the inorganic layer with a selective polymer (e.g., an amine-containing polymer and an amino acid salt dispersed within the amine-containing polymer, or a sterically hindered amine-containing polymer). In some embodiments, the selective polymer can have a high viscosity when applied to the inorganic layer. For example, the selective polymer can have a viscosity of at least 400 cp (e.g., at least 1000 cp) at 25° C.

Methods for separating a gaseous mixture comprising a first gas and a second gas are also provided. The method can include contacting any of the disclosed membrane with the gaseous mixture under conditions effective to afford trans-membrane permeation of the first gas.

DESCRIPTION OF THE DRAWINGS

FIG. 1 is a schematic of a composite membrane disclosed herein.

DETAILED DESCRIPTION

Definitions

Terms used herein will have their customary meaning in the art unless specified otherwise. The organic moieties mentioned when defining variable positions within the general formulae described herein (e.g., the term "halogen") are collective terms for the individual substituents encompassed by the organic moiety. The prefix $C_n$-$C_m$ preceding a group or moiety indicates, in each case, the possible number of carbon atoms in the group or moiety that follows.

As used herein, the term "alkyl" refers to saturated, straight-chained or branched saturated hydrocarbon moieties. Unless otherwise specified, $C_1$-$C_8$ (e.g., $C_1$-$C_6$, $C_1$-$C_4$, $C_2$-$C_8$, $C_2$-$C_6$, $C_2$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, and 1-ethyl-2-methyl-propyl. Alkyl substituents may be unsubstituted or substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied.

As used herein, the term "alkenyl" refers to unsaturated, straight-chained, or branched hydrocarbon moieties containing a double bond. Unless otherwise specified, $C_2$-$C_8$ (e.g., $C_2$-$C_6$, $C_2$-$C_4$) alkyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure —CH═CH$_2$; 1-propenyl refers to a group with the structure —CH═CH—CH$_3$; and 2-propenyl refers to a group with the structure —CH$_2$—CH═CH$_2$. Alkenyl substituents may be unsubstituted or substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_8$ (e.g., $C_2$-$C_6$, $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl. 4-hexynyl, 5-hexynyl 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl. Alkynyl substituents may be unsubstituted or substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied.

As used herein, the term "aryl," as well as derivative terms such as aryloxy, refers to groups that include a monovalent aromatic carbocyclic group of from 6 to 14 carbon atoms. Aryl groups can include a single ring or multiple condensed rings. In some embodiments, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some embodiments, the aryl group can be a phenyl, indanyl or naphthyl group. The term "heteroaryl", as well as derivative terms such as "heteroaryloxy", refers to a 5- or 6-membered aromatic ring containing one or more heteroatoms, viz., N, O or S; these heteroaromatic rings may be fused to other aromatic systems. The aryl or heteroaryl substituents may be unsubstituted or substituted with one or more chemical moieties. Examples of suitable substituents include, for example, hydroxy, halogen, nitro, cyano, formyl, $C_1$-$C_6$ alkyl, $C_2$-$C_6$ alkenyl, $C_2$-$C_6$ alkynyl, $C_1$-$C_6$ alkoxy, $C_1$-$C_6$ haloalkyl, $C_1$-$C_6$ haloalkoxy, $C_1$-$C_6$ acyl, $C_1$-$C_6$ alkylthio, $C_1$-$C_6$ alkylsulfinyl, $C_1$-$C_6$ alkylsulfonyl, $C_1$-$C_6$ alkoxycarbonyl, $C_1$-$C_6$ carbamoyl, hydroxycarbonyl, $C_1$-$C_6$ alkylcarbonyl, aminocarbonyl, $C_1$-$C_6$ alkylaminocarbonyl, $C_1$-$C_6$ dialkylaminocarbonyl, provided that the substituents are sterically compatible and the rules of chemical bonding and strain energy are satisfied.

Membranes

Membranes, methods of making the membranes, and methods of using the membranes are described herein. The membranes can comprise a gas permeable support layer, and a selective polymer layer disposed on the gas permeable support layer. Optionally, the membranes can further comprise an inorganic layer. In these embodiments, the inorganic layer can be disposed on the gas permeable support layer, and the selective polymer layer can be disposed on the inorganic layer. The gas permeable support layer, the inorganic layer (when present), and the selective polymer layer can optionally comprise one or more sub-layers.

The gas permeable support layer can be a porous layer that comprises a plurality of substantially connected pores. "Substantially connected" as used herein, refer to pores that are connected with each other, and substantially extend from a surface of the support layer to an inner portion of the support layer.

The gas permeable support layer can be formed from any suitable material. The material used to form the gas permeable support layer can be chosen based on the end use application of the membrane. In some embodiments, the gas permeable support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, polymeric organosilicones, fluorinated polymers, polyolefins, copolymers thereof, or blends thereof. Specific examples of polymers in the gas permeable support layer can include polydimethylsiloxane, polydiethylsiloxane, polydi-isopropylsiloxane, polydiphenylsiloxane, polyethersulfone, polyphenylsulfone, polysulfone, partially fluorinated or perfluorinated derivatives thereof, copolymers thereof, or blends thereof. In some embodiments, the gas permeable polymer can be polyethersulfone. If desired, the gas permeable support layer can include inorganic particles to increase the mechanical strength without altering the permeability of the support layer.

In certain embodiments, the gas permeable support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester.

The inorganic layer can comprise a plurality of discreet nanoparticles having an average particle size of less than 1 micron. The inorganic layer can comprise multiple pores and/or channels formed between the nanoparticles and/or within the nanoparticles. The pores and/or channels formed can be in fluid contact with the gas permeable support layer.

The nanoparticles in the inorganic layer can have any suitable size and shape. For example, the nanoparticles can be spherical, cylindrical, or rod-like. In some embodiments, the nanoparticles can have an average particle size of less than 1 micron (e.g., less than 750 nm, less than 500 nm, less than 250 nm, less than 200 nm, less than 150 nm, less than 100 nm, less than 50 nm, or less than 25 nm. In some embodiments, the nanoparticles can have an average particle size of at least 1 nm (e.g., at least 5 nm, at least 10 nm, at least 15 nm, or at least 25 nm). The nanoparticles can have an average particle size ranging from any of the minimum values described above to any of the maximum values described above. For example, in certain embodiments, the nanoparticles can have an average particle size of from 1 nm to 200 nm (e.g., from 1 nm to 150 nm, from 1 nm to 100 nm, or from 1 nm to 50 nm). The term "average particle size," as used herein, generally refers to the statistical mean particle size (diameter) of the particles in a population of particles. The diameter of an essentially spherical particle may refer to the physical or hydrodynamic diameter. The diameter of a non-spherical particle may refer preferentially to the hydrodynamic diameter. As used herein, the diameter of a non-spherical particle may refer to the largest linear distance between two points on the surface of the particle. Mean particle size can be measured using methods known in the art, such as dynamic light scattering or electron microscopy.

In some embodiments, the nanoparticles in the inorganic layer comprise a population of nanoparticles having a monodisperse particle size distribution. The term "monodisperse," as used herein, describes a population of nanoparticles where all of the nanoparticles are the same or nearly the same size. As used herein, a monodisperse particle size distribution refers to particle distributions in which 80% of the distribution (e.g., 85% of the distribution, 90% of the distribution, or 95% of the distribution) lies within 20% of the median particle size (e.g., within 15% of the median particle size, within 10% of the median particle size, or within 5% of the median particle size).

The nanoparticles can be formed from a variety of suitable materials. In certain embodiments, the nanoparticles can be selected to have a surface chemistry that is compatible with the selective polymer layer, the gas permeable support layer, or a combination thereof. For example, in certain cases, the nanoparticle can comprise hydrophilic nanoparticles. Examples of suitable nanoparticles include alkaline earth metal oxide nanoparticles, transition metal oxide nanoparticles, lanthanide metal oxide nanoparticles, group IVA metal oxide nanoparticles, transition metal nanoparticles, transition-metal catalyst nanoparticles, nanoparticles comprising a transition metal adsorbed on a non-reactive support, metal alloy nanoparticles, silicate nanoparticles, alumino-silicate nanoparticles, nanoparticles comprising clays, and combinations thereof. Specific examples of nanoparticles include alumina nanoparticles, silica nanoparticles, zeolite nanoparticles, titania nanoparticles, zirconia nanoparticles, palladium nanoparticles, platinum nanoparticles, nickel nanoparticles, transition-metal catalyst nanoparticles, and combinations thereof.

In certain embodiments, the nanoparticles in the inorganic layer can be chosen from silicate nanoparticles, alumina-silicate nanoparticles, or combinations thereof. In certain embodiments, the nanoparticles can comprise zeolite nanoparticles. The zeolite nanoparticles can comprise zeolites having varying frameworks and differing Si/Al ratios. For example, the nanoparticles can be zeolite Y nanoparticles.

The membranes can further include a selective polymer layer disposed on the inorganic layer. In some cases, the selective polymer layer can be a selective polymer through which gas permeates via diffusion or facilitated diffusion. The selective polymer layer can comprise a selective polymer having a $CO_2:N_2$ selectivity of at least 10 at 57° C. and 1 atm feed pressure. For example, the selective polymer can have a $CO_2:N_2$ selectivity of at least 25 at 57° C. and 1 atm feed pressure (e.g., at least 50, at least 75, at least 100, at least 150, at least 200, at least 250, at least 300, at least 350, at least 400, at least 450, at least 500, at least 550, at least 600, at least 650, at least 700, at least 750, at least 800, at least 850, at least 900, at least 950, at least 1,000, at least 1,100, at least 1,200, at least 1,300, or at least 1,400). In some embodiments, the selective polymer can comprise a selective polymer that has a $CO_2:N_2$ selectivity of 1,500 or less at 57° C. and 1 atm feed pressure (e.g., 1,400 or less, 1,300 or less, 1,200 or less, 1,100 or less, 1,000 or less, 950 or less, 900 or less, 850 or less, 800 or less, 750 or less, 700 or less, 650 or less, 600 or less, 550 or less, 500 or less, 450 or less, 400 or less, 350 or less, 300 or less, 250 or less, 200 or less, 150 or less, 100 or less, 75 or less, or 50 or less). In certain embodiments, the selective polymer can comprise a selective polymer that has a $CO_2:N_2$ selectivity ranging from any of the minimum values described above to any of the maximum values described above. For example, in certain embodiments, the selective polymer can comprise a selective polymer that has a $CO_2:N_2$ selectivity of from 10 to 1,500 (e.g., from 75 to 350) at 57° C. The $CO_2:N_2$ selectivity of the selective polymer can be measured using standard methods for measuring gas permeance known in the art, such as those described in ASTM D1434-82 (2015), which is incorporated herein by reference.

In some embodiments, the selective polymer layer can comprise an amine-containing polymer and an amino acid salt dispersed within the amine-containing polymer. In these embodiments, the amine-containing polymer can serve as a "fixed carrier" and the amino acid salt can serve as a "mobile carrier."

The amine-containing polymer can be, for example, polyvinylamine, polyallylamine, polyethyleneimine, poly-N-isopropylallylamine, poly-N-tert-butylallylamine, poly-N-1,2-dimethylpropylallylamine, poly-N-1-methylpropylallylamine, poly-N-2-methylpropylallylamine, poly-N-1-ethylpropylallylamine, poly-N-2-ethylpropylallylamine, poly-N-methylallylamine, poly-N,N-dimethylallylamine, poly-N-ethylallylamine, poly-N,N-diethylallylamine, poly(N-methyl-N-vinylamine), poly(N-ethyl-N-vinylamine), poly(N-isopropyl-N-vinylamine), poly(N-tert-butyl-N-vinylamine), poly(N-propyl-N-vinylamine), poly(N,N-dimethyl-N-vinylamine), poly(N,N-diethyl-N-vinylamine), poly-2-vinylpiperidine, poly-4-vinylpiperidine, polyaminostyrene, chitosan, copolymers, and blends thereof.

In some cases, the amine-containing polymer can comprise polyvinylamine. In some cases, the amine-containing polymer can comprise a sterically hindered derivative of polyvinylamine. In some embodiments, the sterically hindered derivative of polyvinylamine comprises a polymer having the structure below

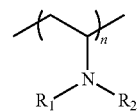

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a hetercyclic ring, with the proviso that at least one of $R_1$ and $R_2$ is not hydrogen; and n is an integer from 10 to 25,000. In some embodiments, the sterically hindered derivative of polyvinylamine comprises a random copolymer or block copolymer having the structure below

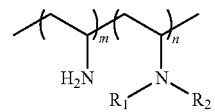

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a hetercyclic ring, with the proviso that at least one of $R_1$ and $R_2$ is not hydrogen; m is an integer from 10 to 10,000; and n is an integer from 10 to 10,000.

The amine-containing polymer can be a high molecular weight amine-containing polymer. For example, the amine-containing polymer can have a weight average molecular weight of at least 500,000 Da (e.g., at least 700,000 Da, or at least 1,000,000 Da). In certain embodiments, the amine-containing polymer can have a weight average molecular weight of from 500,000 Da to 5,000,000 Da, or from 500,000 Da to 2,000,000 Da. In particular embodiments, the amine-containing polymer can be polyvinylamine or a sterically hindered derivative of polyvinylamine having a weight average molecular weight of at least 500,000 Da (e.g., at least 700,000 Da, or at least 1,000,000 Da). For example, the amine-containing polymer can be polyvinylamine or a sterically hindered derivative of polyvinylamine having a weight average molecular weight of from 500,000 Da to 5,000,000 Da, or from 500,000 Da to 2,000,000 Da. The amine-containing polymer can also be a modest molecular weight amine-containing polymer. For example, the amine-containing polymer can have a weight average molecular weight of at least 50,000 Da (e.g., at least 100,000 Da, or at least 500,000 Da). In certain embodiments, the amine-containing polymer can have a weight average molecular weight of from 50,000 Da to 500,000 Da.

The amino acid salt can be a salt of any suitable amino acid. The amino acid salt may be derived, for instance, from glycine, arginine, lysine, histidine, 6-aminohexanoic acid, proline, sarcosine, methionine, or taurine. In some cases, the amino acid salt can comprise a salt of a compound defined by the formula below

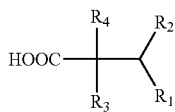

wherein, independently for each occurrence in the amino acid, each of $R_1$, $R_2$, $R_3$ and $R_4$ is selected from one of the following

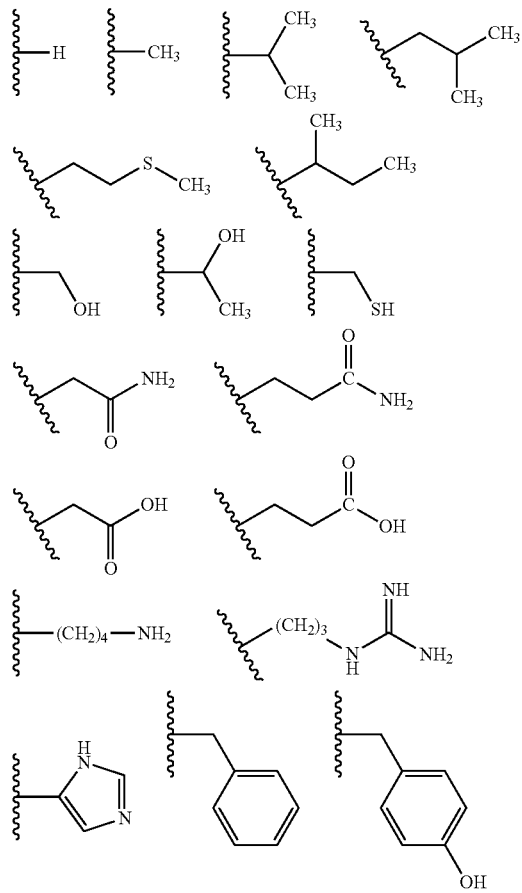

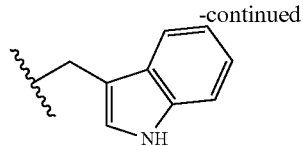

or $R_1$ and $R_3$, together with the atoms to which they are attached, form a five-membered heterocycle defined by the structure below when n is 1, or a six-membered heterocycle defined by the structure below when n is 2

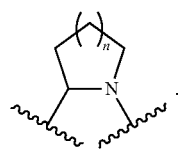

Poly(amino-acids), for example, polyarginine, polylysine, polyonithine, or polyhistidine may also be used to prepare the amino acid salt. In one embodiment, the amino acid salt is an amino acid potassium salt, prepared via reaction between potassium hydroxide in solution and an amino acid. In another embodiment, the amino acid salt is an amino acid sodium salt prepared via reaction between sodium hydroxide in solution and an amino acid. In another further embodiment, the amino acid salt is an amino acid lithium salt, prepared via reaction between lithium hydroxide in solution and an amino acid. In certain embodiments, the amino acid salt can comprise a glycinate salt (e.g., sodium glycinate, potassium glycinate, lithium glycinate, or piperazine glycinate).

In some embodiments, the selective polymer layer can comprise at least 30% by weight (e.g., at least 35% by weight, at least 40% by weight, at least 45% by weight, at least 50% by weight, at least 55% by weight, at least 60% by weight, at least 65% by weight, at least 70% by weight, or at least 75% by weight) amino acid salt, based on the total weight of the selective polymer layer. In some embodiments, the selective polymer layer can comprise 80% or less by weight (e.g., 75% or less by weight, 70% or less by weight, 65% or less by weight, 60% or less by weight, 55% or less by weight, 50% or less by weight, 45% or less by weight, 40% or less by weight, or 35% or less by weight) amino acid salt based on the total weight of the selective polymer layer.

The amount of amino acid salt present in the selective polymer layer can range from any of the minimum values described above to any of the maximum values described above. For example, in some embodiments, the selective polymer layer can comprise from 30% to 70% by weight amino acid salt, based on the total weight of the selective polymer layer.

In other embodiments, the selective polymer layer can comprise a sterically hindered amine-containing polymer. The sterically hindered amine can serve as a "fixed carrier." The sterically hindered amine-containing polymer can include a sterically hindered amine sidechain. Sterically hindered amine sidechains include either a primary amine that is attached to a tertiary carbon or a secondary amine that is attached to at least one secondary carbon or tertiary carbon. In some cases, the sterically hindered amine-containing polymer can comprise a sterically hindered derivative of polyvinylamine. In some embodiments, the sterically hindered derivative of polyvinylamine comprises a polymer having the structure below

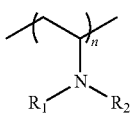

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a hetercyclic ring, with the proviso that at least one of $R_1$ and $R_2$ is not hydrogen; and n is an integer from 10 to 25,000. In some embodiments, the sterically hindered derivative of polyvinylamine comprises a random copolymer or block copolymer having the structure below

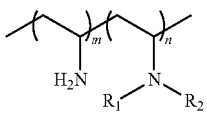

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a hetercyclic ring, with the proviso that at least one of $R_1$ and $R_2$ is not hydrogen; m is an integer from 10 to 10,000; and n is an integer from 10 to 10,000.

The sterically hindered amine-containing polymer can be a high molecular weight sterically hindered amine-containing polymer. For example, the sterically hindered amine-containing polymer can have a weight average molecular weight of at least 500,000 Da (e.g., at least 700,000 Da, or at least 1,000,000 Da). In certain embodiments, the sterically hindered amine-containing polymer can have a weight average molecular weight of from 500,000 Da to 5,000,000 Da, or from 500,000 Da to 2,000,000 Da. In particular embodiments, the sterically hindered amine-containing polymer can be a sterically hindered derivative of polyvinylamine having a weight average molecular weight of at least 500,000 Da (e.g., at least 700,000 Da, or at least 1,000,000 Da). For example, the sterically hindered amine-containing polymer can be a sterically hindered derivative of polyvinylamine having a weight average molecular weight of from 500,000 Da to 5,000,000 Da, or from 500,000 Da to 2,000,000 Da. The sterically hindered amine-containing polymer can also be a modest molecular weight amine-containing polymer. For example, the amine-containing polymer can have a weight average molecular weight of at least 50,000 Da (e.g., at least 100,000 Da, or at least 500,000 Da). In certain embodiments, the amine-containing polymer can have a weight average molecular weight of from 50,000 Da to 500,000 Da.

Optionally in these embodiments, the selective polymer layer can further include a low molecular weight amino compound dispersed within the sterically hindered amine-containing polymer. In these embodiments, the sterically hindered amine-containing polymer can serve as a "fixed carrier" and the low molecular weight amino compound can serve as a "mobile carrier." The low molecular weight amino compound can have a molecular weight of 1,000 Da or less (e.g., 800 Da or less, 500 or less, 300 Da or less, or 250 Da or less). In some embodiments, the low molecular weight amino compound can be non-volatile at the temperatures at which the membrane will be stored or used. For example, the low molecular weight amino compound can comprise a salt of a primary amine or a salt of a secondary amine.

In certain embodiments, the low molecular weight amino compound can comprise an amino acid salt. The amino acid salt can be a salt of any suitable amino acid. In some cases, the amino acid salt can comprise a salt of a compound defined by the formula below

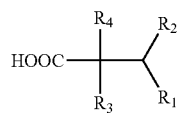

wherein, independently for each occurrence in the amino acid, each of $R_1$, $R_2$, $R_3$ and $R_4$ is selected from one of the following

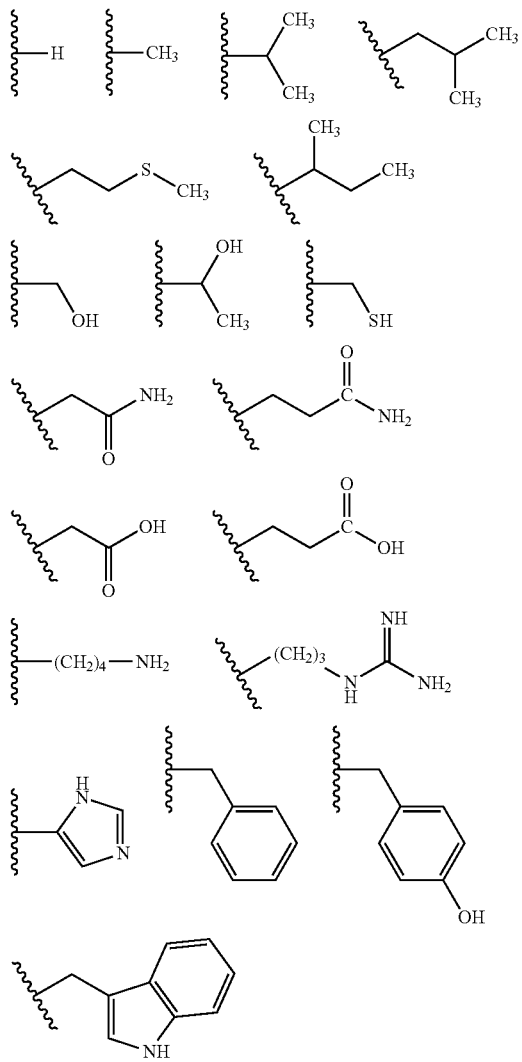

or $R_1$ and $R_3$, together with the atoms to which they are attached, form a five-membered heterocycle defined by the structure below when n is 1, or a six-membered heterocycle defined by the structure below when n is 2

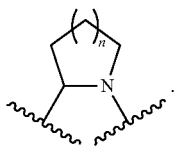

In certain embodiments, the amino acid salt can comprise a glycinate salt (e.g., sodium glycinate, potassium glycinate, lithium glycinate, or piperazine glycinate). The selective polymer layer can comprise from 30% to 80% by weight amino acid salt, based on the total weight of the selective polymer layer.

Other suitable low molecular weight amino compounds include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

Optionally, the selective polymer layer can further include a hydrophilic polymer. For example, the selective polymer can comprise a combination of a hydrophilic polymer, an amine-containing polymer, and an amino acid salt, or a combination of a hydrophilic polymer, a sterically hindered amine-containing polymer, and optionally a low molecular weight amino compound. In these embodiments, the selective polymer layer can include any suitable hydrophilic polymer. Examples of hydrophilic polymers suitable for use in the selective polymer layer can include polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the hydrophilic polymer includes polyvinylalcohol.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinylalcohol having a weight average molecular weight of from 50,000 Da to 150,000 Da. In other embodiments, the hydrophilic polymer can be a high molecular weight hydrophilic polymer. For example, the hydrophilic polymer can have a weight average molecular weight of at least 500,000 Da (e.g., at least 700,000 Da, or at least 1,000,000 Da).

The selective polymer layer can comprise any suitable amount of the hydrophilic polymer. For example, in some cases, the selective polymer layer can comprise from 10% to 90% by weight (e.g., from 10% to 50% by weight, or from 10% to 30% by weight) hydrophilic polymer, based on the total weight of the components used to form the selective polymer layer.

In some embodiments, the selective polymer can also include a cross-linking agent. Cross-linking agents suitable for use in the selective polymer can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The selective polymer can comprise any suitable amount of the cross-linking agent. For example, the selective polymer can comprise 1 to 40 percent cross-linking agents by weight of the selective polymer.

The selective polymer layer can further include a base. The base can act as a catalyst to catalyze the cross-linking of the selective polymer layer (e.g., cross-linking of a hydrophilic polymer with an amine-containing polymer). In some embodiments, the base can remain in the selective polymer and constitute a part of the selective polymer. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The selective polymer can comprise any suitable amount of the base. For example, the selective polymer can comprise 1 to 40 percent base by weight of the selective polymer.

If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

The total thickness of each layer in the membrane can be chosen such that the structure is mechanically robust, but not so thick as to impair permeability. In some embodiments, the selective layer can have a thickness of from 50 nanometers to 5 microns (e.g., from 50 nm to 2 microns, or from 100 nanometers to 750 nanometers, or from 250 nanometers to 500 nanometers). In some embodiments, the inorganic layer can have a thickness of from 50 nanometers to 5 microns (e.g., from 50 nm to 2 microns, or from 100 nanometers to 750 nanometers, or from 250 nanometers to 500 nanometers). In some embodiments, the gas permeable support layer can have a thickness of from 1 micron to 500 microns (e.g., from 50 to 250 microns). In some cases, the membranes disclosed herein can have a thickness of from 5 microns to 500 microns.

Methods

Methods of making the membranes are also disclosed herein. Methods of making membranes can include depositing a nanoparticle dispersion on a gas permeable support layer to form an inorganic layer disposed on the gas permeable support layer. The nanoparticle dispersion can comprise a plurality of discreet nanoparticles having an average particle size of less than 1 micron in a suitable fluid carrier. In some embodiments, depositing the nanoparticle dispersion on the gas permeable support layer can comprise vacuum-assisted dip-deposition of the nanoparticle dispersion on the gas permeable support layer. Methods can further include coating the inorganic layer with a selective polymer (e.g., an amine-containing polymer and an amino acid salt dispersed within the amine-containing polymer, or a sterically hindered amine-containing polymer). In some embodiments, the selective polymer can have a high viscosity when applied to the inorganic layer. For example, the selective polymer can have a viscosity of at least 400 cp (e.g., at least 1000 cp) at 25° C. The viscosity can be measured using a Brookfield viscometer (Brookfield AMETEK, Middleboro, Mass.).

In one example method of preparing a membrane disclosed herein, zeolite nanoparticles can be dispersed in water via ultrasonication. During sonication, the water can be changed intermittently to prevent a temperature rise. The nanoparticle dispersion can then be deposited onto a gas permeable support layer using a vacuum-assisted dip-depositing set-up. In this set-up, there is a circular or rectangular holder with a hollow handle connected to a Duoseal 1405 liquid ring vacuum pump. The holder has evenly placed grooves for uniform distribution of the vacuum. A porous base, such as a metal plate is held on the holder by the vacuum. The support to be coated can then be fixed and flattened on the metal plate by both tape and vacuum. The top surface of a gas permeable support can then be dipped tangentially (as in crossflow filtration) into the dispersion and then taken out. The vacuum in addition to assisting the layer formation helps to keep the support flat during the deposition process. After the deposition, the inorganic nanoparticle layer can be dried overnight at room temperature prior to further characterization. The inorganic layer can be characterized by Scanning Electron Microscopy (SEM) and/or Dynamic Light Scattering. Pretreatment of the gas permeable support polymer may be necessary to remove water or other adsorbed species using methods appropriate to the support and the adsorbate. Examples of absorbed species are, for example, water, alcohols, porogens, and surfactant templates.

The selective polymer can be prepared by first forming a coating solution of the components making up the selective polymer layer in a suitable solvent. One example of a suitable solvent is water. In some embodiments, the amount of water employed will be in the range of from 50% to 99%, by weight of the coating solution. The coating solution can then be used in forming a nonporous selective polymer membrane. The selective polymer can be formed into a nonporous membrane by using any suitable techniques. For example, the coating solution can be coated onto a substrate using any suitable techniques, and the solvent may be evaporated such that a nonporous membrane is formed on the substrate. Examples of suitable coating techniques include, but are not limited to, "knife coating" or "dip coating". Knife coating include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip coating include a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc.

In some embodiments, membranes formed from selective polymers containing for example, one or more polymers, a cross-linking agent, and a base in a suitable solvent can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be coated onto the top layer of the support coated with the inorganic layer and the solvent evaporated, as discussed above. In some embodiments, a higher degree of cross-linking for the selective polymer after solvent removal takes place at about 100° C. to about 180° C., and the cross-linking occurs in from about 1 to about 72 hours.

An additive may be included in the selective polymer before forming the selective layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making the membrane can be scaled to industrial levels.

The membranes disclosed herein can be used for separating a gaseous mixture comprising a first gas and a second gas. For example, the membranes can be used to separate an acidic gas from a gaseous mixture containing at least one acidic gas. Methods of using the membrane can include contacting the membrane, on the side comprising the selective polymer, with the gaseous mixture under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprises at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate fluids at any suitable temperature, including temperatures of 100° C. or greater. For example, the membrane can be used at temperatures of from 100° C. to 180° C. In some embodiments, the membrane can be used at temperatures less than 100° C.

The first gas can include an acid gas. For example, the first gas can be carbon dioxide, hydrogen sulfide, hydrochloric acid, sulfur dioxide, sulfur trioxide, nitrogen oxide, or combinations thereof. In some embodiments, the membrane can be selective to carbon dioxide versus hydrogen, nitrogen, or combinations thereof. In some embodiments, the membrane can be selective to hydrogen sulfide versus hydrogen, nitrogen, or combinations thereof. In some embodiments, the membrane can be selective to hydrochloric acid gas versus hydrogen, nitrogen, or combinations thereof. In some embodiments, the acid gas may be derived from fossil fuels that require hydrogen purification for fuel cell, electricity generation, and hydrogenation applications, biogas for renewable energy, and natural gas for commercial uses. The membranes can also be used for removal of carbon dioxide from flue gas.

The permeance of the first gas or the acid gas can be at least 100 GPU at 57° C. and 1 atm feed pressure. In some embodiments, the permeance of the first gas or the acid gas through the membranes can be up to 3,000 GPU at 57° C. and 1 atm feed pressure. For example, the permeance of the first gas or the acid gas through the membranes can be 150 GPU or greater, 200 GPU or greater, 250 GPU or greater, 300 GPU or greater, 400 GPU or greater, 500 GPU or greater, 1,000 GPU or greater, 1,500 GPU or greater, 2,000 GPU or greater, or 2,500 GPU or greater at 57° C. and 1 atm feed pressure. The membrane can exhibit a first gas:second gas selectivity of at least 30 at 57° C. and 1 atm feed pressure. In some embodiments, the membrane can exhibit a first gas:second gas selectivity of up to 1,500 at 57° C. and 1 atm feed pressure. For example, the membrane can exhibit a first gas:second gas selectivity of 35 or greater, 40 or greater, 45 or greater, 50 or greater, 55 or greater, 60 or greater, 65 or greater, 70 or greater, 75 or greater, 80 or greater, 85 or greater, 90 or greater, 95 or greater, 100 or greater, 125 or greater, 150 or greater, 175 or greater, 200 or greater, 225 or greater, 250 or greater, 275 or greater, 300 or greater, 325 or greater, 350 or greater, 375 or greater, 400 or greater, 425 or greater, 450 or greater, 475 or greater, 500 or greater, 550 or greater, 600 or greater, 650 or greater, 700 or greater, 750 or greater, 800 or greater, 850 or greater, 900 or greater, 950 or greater, 1,000 or greater, 1,100 or greater, 1,200 or greater, 1,300 or greater, or 1,400 or greater at 57° C. and 1 atm feed pressure. In some embodiments, the permeance and selectivity of the membrane for the first gas or the acid gas can vary at higher or lower temperatures.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the disclosure. Unless indicated otherwise, parts are parts by weight, temperature is in ° C. or is at ambient temperature, and pressure is at or near atmospheric.

Example 1

Polyvinylamine/Amino Acid Salt Membranes for $CO_2$ Separation

Provided are membranes formed from polyvinylamine (PVAm) and different amino acid salts for $CO_2$ separation. High molecular-weight PVAm was synthesized, and different amino acid salts were incorporated into the PVAm solution to prepare thin membranes. In these membranes, PVAm serves as a fixed carrier for $CO_2$ transport, and the amino acid salt acts as a mobile carrier for $CO_2$ transport. The membranes exhibit both high $CO_2$ permeance and high $CO_2/N_2$ selectivity. The membranes can be used to perform gas separations, including $CO_2$ capture from flue gas in power plants and the removal of carbon dioxide and hydrogen sulfide from synthesis gas, $H_2$-containing mixtures, and $CH_4$-containing mixtures.

Background $CO_2$ emissions from the fossil fuel combustion are believed to be one of the main reasons for global warming, and therefore there is a significant demand of developing technologies for $CO_2$ separation from flue gas. Membrane separation has become an energy-efficient and cost-effective alternative to conventional technologies including absorption processes using amine-based solvents, adsorption processes employing solid adsorbents, and cryogenic distillation.

Facilitated transport membranes can provide a high $CO_2$ permeance while maintaining a high $CO_2/N_2$ selectivity as compared to solution-diffusion membranes. In the facilitated transport membranes, there is a reversible reaction between the $CO_2$ molecules and the reactive carriers which usually contain amino groups. Fixed carriers (amine-containing polymers) and mobile carriers (amine-containing small molecules) are two major categories of carriers for $CO_2$ transport in the facilitated transport membranes. The fixed carriers such as pollyallyamine [1-5], polyethylenimine [1,6] and polyvinylamine [7-10] have been reported in the literatures. The common mobile carriers that have been reported in the literature include ethylenediamine [10-12], amino acid salts [13,14], and alkanolamines [15,16]. In facilitated transport membranes, $CO_2$ molecules react with amine carriers first, and then the reaction products transport across the membrane, releasing the $CO_2$ molecules to the permeate side of the membrane. By this mechanism, the solubility of $CO_2$ molecules in the membrane can be greatly enhanced. On the other hand, the non-reactive molecules, such as $N_2$, $H_2$, $CH_4$, and CO, transport through the membrane only by the solution-diffusion mechanism. In this way, facilitated transport mechanisms can provide for membranes that exhibit both a high $CO_2$ permeance, and a high $CO_2$ selectivity vs. other gases (e.g., $N_2$, $H_2$, $CH_4$, and/or CO).

Overview

Polyvinylamine (PVAm) with a high molecular weight was synthesized. The PVAm can act as a fixed carrier in the membranes. Various amino acid salts can be incorporated within the PVAm to serve as a mobile carrier. A viscous PVAm/mobile carrier coating solution was knife-coated onto the different substrates to form a thin selective layer of the membranes.

As the fixed-carrier in the selective polymer layer, PVAm not only provides amino groups for $CO_2/N_2$ separation, but also provides the mechanical strength and film-forming ability of the membrane. Therefore, a higher molecular weight of PVAm is beneficial. First, with a higher molecular weight, the polymer matrix will be stronger, which makes the membrane more stable. Second, due to the stronger polymer matrix, more mobile carriers can be incorporated into the polymer solution, which can further improve the transport performance. Third, a higher viscosity of the casting solution can be obtained with a higher molecular weight of PVAm, which can reduce the penetration of polymer solution into the substrate, resulting in less mass transfer resistance and higher $CO_2$ permeance. Moreover, thinner membranes can be obtained from the solution with a low concentration and a high viscosity, which can result in a higher $CO_2$ permeance.

The PVAm synthesized herein exhibited a much higher molecular weight than commercially available PVAm (e.g., LUPAMIN®, commercially available from BASF Corporation). Further, the viscosity of a 3 wt. % solution of the PVAm synthesized herein exhibited a remarkably higher viscosity than a 3 wt. % solution of LUPAMIN® polymer. Moreover, because LUPAMIN® is prepared by basic hydrolysis with sodium hydroxide (NaOH), and the resulting byproduct formed during hydrolysis (sodium formate salt) remains in the LUPAMIN®. The inclusion of a large amount of non-reactive salts in the polymer can negatively impact the stability of membranes formed from the polymer due to the salting out problem. By preparing the PVAm using acidic hydrolysis, no byproduct is formed. Overall, the high molecular weight PVAm prepared herein offers significant advantages in terms of resulting membrane transport performance as compared to commercially available LUPAMIN®.

In the case of the facilitated transport mechanism, the $CO_2$ transport of the fixed carrier is limited by the mobility of the $CO_2$-carrier complex. Incorporation of mobile carriers enhances $CO_2$ transport. Here, various amounts of amino acid salts were incorporated into the PVAm solution to form a coating solution. By incorporating mobile carriers into the membrane, $CO_2$ permeance could be increased. $CO_2$ permeance generally increases as the amount of mobile carrier is increased. However, upon incorporation of very high levels of mobile carrier (e.g., more than 65 wt. % mobile carrier, based on the total weight of the selective polymer layer), the stability of the membrane began to be compromised. At these high loading levels, the polymer matrix lacked the structural integrity to contain the mobile carrier. In another words, the mobile carrier could begin to leak from the selective polymer layer into adjacent layers of the polymer membrane (e.g., into the pores of the support layer or the inorganic layer), diminishing membrane performance.

PVAm Synthesis 25.726 g N-vinylformamide (NVF) monomer was added to 58.955 g $H_2O$ to form a 30 wt. % monomer solution. The solution was placed in a 250-mL 3-neck round-bottom flask under nitrogen protection, and preheated to 50° C. in a water bath 0.129 g 2,2'-azobis(2-methylpropionamidine) dihydrochloride (AIBA) initiator (initiator/monomer weight ratio=0.5/100) was added to the solution. Then, the polymerization was carried out under nitrogen at 50° C. for 3 h. After the polymerization, the polymer solution was transferred to 360 mL 2 M HCl aqueous solution to carry out the acidic hydrolysis at 70° C. for 5 h. After hydrolysis, the polymer solution was poured into a large amount of ethanol (ethanol/polymer solution volume ratio~4/1) for precipitation. The obtained polymer was dried in a vacuum oven at 60° C. for 48 hours and then dissolved in water to form a 3 wt. % solution. Strong base anion-exchange resin was added to the polymer solution to adjust the pH to 10, followed by vacuum filtration to remove the resin.

The aforementioned 3 wt. % PVAm solution showed a viscosity of 486 cp which was characterized using the Brookfield Digital Viscometer DV-E (Brookfield Engineering Laboratories, Inc., Middleboro, Mass.). A weight average molecular weight of 719,000 which was characterized by dynamic light scattering (DLS) using Zetasizer Nano ZS (Malvern Instruments Inc., Westborough, Mass.).

High Molecular-Weight PVAm Synthesis

The polymerization was carried out as described in Example 1 except that 25.726 g NVF was added in 38.389 g $H_2O$ to form a solution with 40 wt. % monomer concentration. 0.036 g AIBA was added as the initiator (i.e., an initiator/monomer weight ratio of 0.14/100). All the other synthesis conditions were the same as in Example 1. The resulting 3 wt. % PVAm solution exhibited a viscosity of 1,400 cp. The PVAm had a weight average molecular weight of 1,200,000.

Piperazine Glycinate Mobile Carrier Synthesis 21.532 g glycine (98.5% purity) was dissolved in 99.662 g water to form a 17.50 wt. % solution and stirred for 2 h at room temperature. Then, an equivalent molar amount of piperazine (i.e., a stoichiometric amount, 24.583 g piperazine (99% purity)) was added to react with glycine to form the amino acid salt (piperazine glycinate). The reaction took place at room temperature for 2 h. The concentration of the resulting piperazine glycinate solution was 31.24 wt. %.

Potassium Glycinate Mobile Carrier Synthesis 20.248 g potassium hydroxide (KOH, 85% purity) was dissolved in 25.746 g water to form a KOH aqueous solution with a concentration of 37.42 wt. %. 22.102 g glycine (98.5% purity) was dissolved in 104.195 g water to form a 17.24 wt. % solution and stirred for 2 h at room temperature. 43.450 g KOH aqueous solution with a concentration of 37.42 wt. % was added to the glycine solution to form a potassium glycinate solution with a concentration of 19.33 wt %.

Lithium Glycinate Mobile Carrier Synthesis 14.464 g lithium hydroxide monohydrate ($LiOH \cdot H_2O$) was dissolved in 77.351 g water to form a LiOH aqueous solution with a concentration of 8.99 wt. %. 4.420 g glycine (98.5% purity) was dissolved in 20.839 g water to form a 17.24 wt. % solution and stirred for 2 h at room temperature 15.480 g LiOH aqueous solution with a concentration of 8.99 wt. % was added to the glycine solution to form a lithium glycinate solution with a concentration of 11.54 wt. %.

Piperazine Glycinate/PVAm Membrane Preparation

A membrane comprising 65 wt. % piperazine glycinate and 35 wt. % PVAm was prepared. To 10.000 g 3 wt. % PVAm solution prepared as described in Example 1, 1.783 g piperazine glycinate solution with a concentration of 31.24 wt. % described in Example 1 was added. The mixture was stirred at room temperature under $N_2$ purge with a 100 cc/min flow rate to form a homogeneous concentrated coating solution. The total solid concentration of the coating solution was 20 wt. %. The amine-containing coating solution was coated on top of a zeolite Y nanoparticle layer using a knife-coating method. In other words, the coating solution was coated onto the flat-sheet zeolite Y seed layer (with 40-nm nanoparticles) deposited on top of Millipore PES300 substrate using a GARDCO adjustable micrometer film applicator (Paul N. Gardner Company, Pompano Beach, Fla.) with a 1 μm wet film gap setting. The membrane was dried in a fume hood at room temperature for overnight before testing. The dry membrane thickness was around 100 nm.

Gas transport performance measurements were conducted using a permeation apparatus as described below. Briefly, the composite membrane was loaded into a stainless steel rectangular permeation cell inside a temperature-controlled oven (Bemco Inc. Simi Valley, Calif.) with an effective membrane area of 3.4 $cm^2$. A countercurrent flow configuration (with a feed gas flow rate of 60 cc/min and a sweep gas flow rate of 30 cc/min) was applied to offer the maximum driving force across the membrane. The binary gas mixture containing 20% $CO_2$ and 80% $N_2$ was used as the feed gas, while argon was used as the sweep gas. Both the feed gas and the sweep gas were humidified by passing through 100 mL water in a 500 mL stainless steel humidifier (Swagelok, Westerville, Ohio) filled with 60% (by volume) packing of glass Raschig rings, to achieve a water content of 17% at 57° C. The testing temperature was set to be 57° C., which is the typical flue gas stream temperature. The testing pressures were 1.5 psig for the feed side and 1.0 psig for the sweep side, respectively. The outlet gas compositions of both retentate and permeate streams were analyzed by using a gas chromatograph (GC) equipped with a thermal conductivity detector (TCD) (Agilent Technologies, Palo Alto, Calif.). SUPELCO Carboxen® 1004 micropacked GC column (Sigma-Aldrich, St. Louis, Mo.) was used in this work. $CO_2$ permeance and $CO_2/N_2$ selectivity are shown below.

TABLE 1

Transport result of 65/35 piperazine glycinate/PVAm membrane with 100 nm thickness.

| Testing T (° C.) | Feed P (psig) | Sweep P (psig) | Water Content | $CO_2$ Permeance (GPU) | $CO_2/N_2$ Selectivity |
|---|---|---|---|---|---|
| 57 | 1.5 | 1.0 | 17% | 1100 | 210 |

Potassium Glycinate/PVAm Membrane Synthesis

A membrane comprising 55 wt. % potassium glycinate and 45 wt. % PVAm was prepared. To 10.000 g 3 wt. % PVAm solution prepared as described in Example 1, 1.897 g potassium glycinate solution with a concentration of 19.33 wt. % described in Example 1 was added. The membrane was prepared as described in Example 1 except that the wet film gap setting was 2 μm. The dry membrane thickness was around 200 nm. The membrane transport performance is shown below.

TABLE 2

Transport result of 55/45 potassium glycinate/PVAm membrane with 200 nm thickness.

| Testing T (° C.) | Feed P (psig) | Sweep P (psig) | Water Content | $CO_2$ Permeance (GPU) | $CO_2/N_2$ Selectivity |
|---|---|---|---|---|---|
| 57 | 1.5 | 1.0 | 17% | 620 | 175 |

Lithium Glycinate/PVAm Membrane Synthesis

A membrane comprising 50 wt. % lithium glycinate and 50 wt. % PVAm was prepared. To 10.000 g 3 wt. % PVAm solution prepared as described in Example 1, 2.600 g lithium glycinate solution with a concentration of 11.54 wt. % described in Example 1 was added. The membrane was prepared as described in Example 1 except that the wet film gap setting was 3 μm. The dry membrane thickness was around 300 nm. The membrane transport performance is shown below.

TABLE 3

Transport result of 50/50 lithium glycinate/PVAm membrane with 300 nm thickness.

| Testing T (° C.) | Feed P (psig) | Sweep P (psig) | Water Content | $CO_2$ Permeance (GPU) | $CO_2/N_2$ Selectivity |
|---|---|---|---|---|---|
| 57 | 1.5 | 1.0 | 17% | 550 | 162 |

Piperazine Glycinate/PVAm/Sodium Dodecyl Sulfate (SDS) Membrane Synthesis

A coating solution comprising 65 wt. % piperazine glycinate and 35 wt. % PVAm was prepared as described in Example 1. To the coating solution, 0.45 g sodium dodecyl sulfate (SDS) surfactant solution with a concentration of 10 wt. % was added (water was used as the solvent to dissolve SDS). The SDS amount was 5 wt. % out of the total solid composition. The final coating solution containing SDS surfactant was coated on a lab-scale polyethersulfone (PES) substrate, which was fabricated using a phase-inversion technique. The reason for incorporating SDS surfactant is that it could improve the adhesion between the amine-containing polymer layer and the PES substrate. Without the SDS surfactant, a lower selectivity (less than 30) was observed. The membrane was coated using the same procedure as described in Example 1, except that a 2-μm wet film gap-setting was used to obtain a dry membrane thickness of around 200 nm. The membrane transport performance is shown below.

TABLE 4

Transport result of 65/35 piperazine glycinate/PVAm membrane including 5 wt. % SDS in the total solid membrane composition with 200 nm thickness.

| Testing T (° C.) | Feed P (psig) | Sweep P (psig) | Water Content | $CO_2$ Permeance (GPU) | $CO_2/N_2$ Selectivity |
|---|---|---|---|---|---|
| 57 | 1.5 | 1.0 | 17% | 931 | 189 |

REFERENCES

[1] W. S. W. Ho, Membranes comprising aminoacid salts in polyamine polymers and blends, U.S. Pat. No. 6,099,621 (2000).

[2] J. Zou, W. S. W. Ho, $CO_2$-selective polymeric membranes containing amines in crosslinked poly(vinyl alcohol), J. Membr. Sci. 286 (2006) 310-321.

[3] J. Huang, J. Zou, W. S. W. Ho, Carbon dioxide capture using a $CO_2$-selective facilitated transport membrane, Ind. Eng. Chem. Res. 47 (2008) 1261-1267.

[4] Y. Zhao, W. S. W. Ho, $CO_2$-selective membranes containing sterically hindered amines for $CO_2/H_2$ separation, Ind. Eng. Chem. Res. 52 (2013) 8774-8782.

[5] Y. Zhao, B. T. Jung, L. Ansaloni, W. S. W. Ho, Multi-walled carbon nanotube mixed matrix membranes containing amines for high pressure $CO_2/H_2$ separation, J. Membr. Sci. 459 (2014) 233-243.

[6] H. Matsuyama, A. Terada, T. Nakagawara, Y. Kitamura, M. Teramoto, Facilitated transport of $CO_2$ through polyethylenimine/poly(vinyl alcohol) blend membrane, J. Membr. Sci. 163 (1999) 221-227.

[7] T.-J. Kim, B. Li, M.-B. Hägg, Novel fixed-site-carrier polyvinylamine membrane for carbon dioxide capture, J. Poly. Sci. Part B: Poly. Phys. 42 (2004) 4326-4336.

[8] L. Deng, T.-J. Kim, M.-B. Hägg, Facilitated transport of $CO_2$ in novel PVAm/PVA blend membrane, J. Membr. Sci. 340 (2009) 154-163.

[9] Z. Qiao, Z. Wang, C. Zhang, S. Yuan, Y. Zhu, J. Wang, PVAm-PIP/PS composite membrane with high performance for $CO_2/N_2$ separation, AIChE Journal 59 (2013) 215-228.

[10] S. Yuan, Z. Wang, Z. Qiao, M. Wang, J. Wang, S. Wang, Improvement of $CO_2/N_2$ separation characteristics of polyvinylamine by modifying with ethylenediamine, J. Membr. Sci. 378 (2011) 425-437.

[11] O. H. LeBlanc, W. J. Ward, S. L. Matson, S. G. Kimura, Facilitated transport in ion-exchange membranes, J. Membr. Sci. 6 (1980) 339-343.

[12] H. Matsuyama, M. Teramoto, H. Sakakura, K. Iwai, Facilitated transport of $CO_2$ through various ion exchange membranes prepared by plasma graft polymerization, J. Membr. Sci. 117 (1996) 251-260.

[13] W. S. W. Ho, Membranes comprising salts of amino-acids in hydrophilic polymers, U.S. Pat. No. 5,611,843 (1997).

[14] R. Yegani, H. Hirozawa, M. Teramoto, H. Himei, O. Okada, T. Takigawa, N. Ohmura, N. Matsumiya, H. Matsuyama, Selective separation of $CO_2$ by using novel facilitated transport membrane at elevated temperatures and pressures, J. Membr. Sci. 291 (2007) 157-164.

[15] Y.-S. Kim, S.-M. Yang, Absorption of carbon dioxide through hollow fiber membranes using various aqueous absorbents, Sep. Purif. Technol. 21 (2000) 101-109.

[16] G. J. Francisco, A. Chakma, X. Feng, Membranes comprising of alkanolamines incorporated into poly(vinyl alcohol) matrix for $CO_2/N_2$ separation. J. Membr. Sci. 303 (2007) 54-63.

Example 2

Sterically Hindered Polyvinylamine Membranes for $CO_2$ Separation

Provided are procedures for the preparation of polyvinylamine (PVAm) and sterically hindered polyvinylamine membranes, and improved methods for synthesizing high molecular weight PVAm. High molecular weight polyvinylamine (PVAm) was synthesized. The PVAm can act as a fixed carrier in the membranes. Optionally, mobile carriers, including varying amino acid salts, can be incorporated within the PVAm. The resulting selective polymer solutions can be used to prepare thin selectively permeable membranes. The membranes can exhibit both high, improved $CO_2$ permeance and $CO_2/N_2$ selectivity. The high-molecular-weight PVAm was modified into sterically hindered polyamines with different degrees of steric hindrance. The membranes prepared from sterically hindered polyamines showed improvement in $CO_2/N_2$ separation performance over those from unhindered polyvinylamine. The membranes are useful for gas separations including $CO_2$ capture from flue gas in power plants and the removal of carbon dioxide and hydrogen sulfide from synthesis gas, $H_2$-containing mixtures, and $CH_4$-containing mixtures.

Background $CO_2$ capture from flue gas (main component: $N_2$) offers the ability to dramatically reduce greenhouse gas emission, and $CO_2$ separation from synthesis gas is effective for hydrogen purification. Due to the inherent advantages of membrane separation (e.g., high energy efficiency, operational simplicity, small footprint, and the elimination of thermodynamic equilibrium capacity limitations), membrane technology is receiving increasing attention for applications in $CO_2$ separation [17]. For most conventional polymer membranes, $CO_2/N_2$ separation follows the solution-diffusion mechanism. The key challenge of solution-diffusion membranes is the trade-off between permeability and selectivity, i.e., the Robeson's Upper Bound [18]. Facilitated transport membranes, which are based on selective reversible reactions, can overcome Robeson's upper bound for the solution-diffusion membranes.

Inside facilitated transport membranes, $CO_2$ follows the facilitated transport mechanism via reversible chemical reactions with carriers, while non-reactive gases, such as $H_2$, CO, and $N_2$, diffuse through the membranes via the solution-diffusion mechanism [19]. Therefore, $CO_2$ transport is facilitated and high $CO_2$/non-reactive gas selectivity can be achieved.

Sterically hindered amines are defined as either primary amines in which the amino group is attached to a tertiary carbon or a secondary amine in which the amino group is attached to at least one secondary or tertiary carbon [20]. $CO_2$ reaction with sterically unhindered amines follows the carbamate zwitterion mechanism proposed by Caplow [21] and Danckwerts [22] and can be described by Eq. 1. The reaction of $CO_2$ and sterically hindered amines can be described by Eq. 2.

$$CO_2 + 2R\text{—}NH_2 \rightleftharpoons R\text{—}NH\text{—}COO^- + R\text{—}NH_3^+ \quad (1)$$

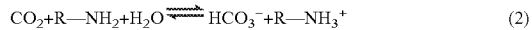

$$CO_2 + R\text{—}NH_2 + H_2O \rightleftharpoons HCO_3^- + R\text{—}NH_3^+ \quad (2)$$

For an unhindered amine that forms a stable carbamate ion with $CO_2$, the stoichiometric loading of $CO_2$ is one mole of $CO_2$ per two moles of the sterically unhindered amine as shown in Eq. 1. However, for a sterically hindered amine, the carbamate ion is not stable due to the incorporation of a bulky substituent group to the nitrogen site, and it is thus converted into the bicarbonate ion. Therefore, the $CO_2$ loading is doubled, with one mole of $CO_2$ per mole of the sterically hindered amine, which is the theoretical maximum loading [23].

Overview

Amine carriers are important for the $CO_2$ separation performance of a facilitated transport membrane. Amine carriers exhibiting a high $CO_2$ loading capacity and reaction rate are desirable. As described above, sterically hindered amines exhibit superior $CO_2$ loading capacity as compared to unhindered amines. Meanwhile, due to the presence of more free amino groups, the reaction rate of $CO_2$ with sterically hindered amines can be increased, though the steric hindrance can lead to a lower reaction rate constant.

Here, polyvinylamine was selected as an amine carrier, since it possesses the highest content of amino groups among the common polyamines (polyallylamine and polyethylenimine) for $CO_2$ facilitated transport. High molecular weight polyvinylamine was synthesized and purified with an improved purification method, which helped to significantly improve $CO_2/N_2$ separation performance.

PVAm was then modified to incorporate sterically hindered amines having different degrees of steric hindrance. Solutions of the resultant sterically hindered polyamines were coated onto polyethersulfone by knife coating to obtain membranes with a thickness of around 8-12 microns. The steric hindrance degrees of different sterically hindered polyamines were calculated. The membrane performance was characterized by the gas transport measurement under the typical conditions for flue gas $CO_2$ capture. The resultant sterically hindered polyvinylamine membranes exhibited higher $CO_2$ permeability and $CO_2/N_2$ selectivity under the test conditions for flue gas carbon capture. Under the testing conditions, $CO_2$ permeability was improved by 24% and $CO_2/N_2$ selectivity was increased by 14% by modifying polyvinylamine into poly(N-methyl-N-vinylamine). These results demonstrate the effect of steric hindrance on $CO_2$ separation performance, as incorporation of a methyl group enhances $CO_2$ loading capacity. Sterically hindered poly(N-isopropyl-N-vinylamine) and poly(N-tert-butyl-N-vinylamine) membranes showed 15% and 11% improvements on $CO_2$ permeability, respectively.

These results can have significant impacts on industrially important $CO_2$ separations, including $CO_2$ capture from flue gas and hydrogen purification from synthesis gas. Moreover, as a result of improved amine carriers, the membranes synthesized in the present invention can be applied for $CO_2$ capture from flue as in coal- and natural gas-fired power plants and from <1% $CO_2$ concentration sources as well as for hydrogen purification from synthesis gas.

High-Molecular-Weight PVAm Synthesis and Purification

First, the monomer N-vinylformamide (NVF) was purified by vacuum distillation at 42° C. to remove the inhibitor and stored at −10° C. Free radical polymerization of NVF was initiated by the decomposition of AIBA and carried out at 50° C. for 3 h in water under nitrogen protection. The initial monomer concentration was 40 wt. %, and the initiator/monomer ratio was 0.14/100 (by weight). After the polymerization, 2 M HCl aqueous solution was added to catalyze the acidic hydrolysis, which lasted for 5 h at 70° C. The molar ratio of HCl to amide groups was 2/1. After hydrolysis, the polymer solution was poured into a large amount of ethanol (ethanol/polymer solution volume ratio=4/1). The polymer was precipitated out from ethanol as white solids and then redissolved into water to form a 4 wt. % aqueous solution, followed by a second-time ethanol precipitation. After the second time ethanol precipitation, the polymer obtained had a narrower molecular weight distribution, which improved the morphology and mechanical strength of the resultant membrane synthesized. The obtained polymer was dried in a vacuum oven at 50° C. for 24 hours and then redissolved in water. An excessive amount of strong anion-exchange resin was used to adjust the pH of the polyvinylamine solution. The resin was removed by vacuum filtration. The resultant polyvinylamine solution had a pH of 10.4.

A membrane comprising 65 wt. % piperazine glycinate and 35 wt. % PVAm synthesized and purified via the aforementioned procedures, was prepared on polyethersulfone (PES) substrates (pore size: 39 nm), with a thickness of around 150 nm. The synthesized membrane was loaded into a stainless-steel rectangular permeation cell with an effective membrane area of 2.7 cm² inside a temperature-controlled oven (Bemco Inc. Simi Valley, Calif.). A countercurrent flow configuration (with a feed gas flow rate of 98 cc/min and a sweep gas flow rate of 30 cc/min) was applied to offer the maximum driving force across the membrane, The binary gas mixture containing 20% $CO_2$ and 80% $N_2$ (on dry basis) was used as the feed gas, while argon was used as the sweep gas. Both the feed gas and the sweep gas were humidified by each passing through 100 mL water in a 500-mL stainless-steel humidifier (Swagelok, Westerville, Ohio) filled with 60% (by volume) packing of glass Raschig rings, to achieve a water vapor content of about 17% at 57° C. The testing temperature was set to be 57° C., which is the typical flue gas stream temperature. The testing pressures were 1.1 psig for the feed side and 1.0 psig for the sweep side, respectively. The outlet gas compositions of both retentate and permeate streams were analyzed by using a gas chromatograph (GC) equipped with a thermal conductivity detector (TCD) (Agilent Technologies, Palo Alto, Calif.). The SUPELCO Carboxen® 1004 micropacked GC column (Sigma-Aldrich, St. Louis, Mo.) was used in this work. The gas transport measurement results are listed in Table 5. As shown in this table, the membrane with PVAm purified with 2-time ethanol precipitation exhibited significantly higher $CO_2$ permeance than that with 1-time ethanol precipitation. In addition, the former had a higher $CO_2/N_2$ selectivity than the latter.

TABLE 5

Transport measurement results of the membranes with PVAm purified with 1-time ethanol precipitation and 2-time ethanol precipitation.

|  | $CO_2$ Permeance (GPU) | $CO_2/N_2$ Selectivity |
| --- | --- | --- |
| 1-time ethanol precipitation | 644 | 138 |
| 2-time ethanol precipitation | 757 | 151 |

Poly(N-methyl-N-vinylamine) Membrane Synthesis

The aqueous polyvinylamine solution was adjusted to have a pH of 12.0, which ensured the amino groups of polyvinylamine were all deprotonated to free amino groups. To synthesize poly(N-methyl-N-vinylamine), iodomethane and KOH, each at one equivalent amount, were added into the above PVAm solution. The reaction was conducted at 45° C. for 48 hours in a reactor equipped with a cold-water condenser. After the reaction, the solution was cooled down to room temperature and then transferred to the cellulose dialysis tubing, which was sealed at both ends using clips and put in deionized water under stirring for 4 h. The deionized water was refreshed every 15 minutes. Then, the by-product, potassium iodide, was removed completely. The obtained poly(N-methyl-N-vinylamine) solution was purged under nitrogen flow (with a flow rate of around 100 cc/min) to possess a good viscosity due to an increased concentration. The viscous poly(N-methyl-N-vinylamine) solution was coated onto the PES substrate (pore size: 39 nm) with the polyamine layer thickness of 8-12 μm. As a comparison, the pure PVAm membrane was also prepared and tested at the same transport measurement conditions, which are described in the following paragraph.

The membrane was loaded into a stainless-steel rectangular permeation cell with an effective membrane area of 5.7 cm² inside a temperature-controlled oven (Bemco Inc. Simi Valley, Calif.). A countercurrent flow configuration (with a feed gas flow rate of 98 cc/min and a sweep gas flow rate of 30 cc/min) was applied to offer the maximum driving force across the membrane. The binary gas mixture containing 20% $CO_2$ and 80% $N_2$ (on dry basis) was used as the feed gas, while argon was used as the sweep gas. Both the feed gas and the sweep gas were humidified by each passing through 100 mL water in a 500-mL stainless-steel humidifier (Swagelok, Westerville, Ohio) filled with 60% (by volume) packing of glass Raschig rings, to achieve a water vapor content of about 17% at 57° C. The testing temperature was set to be 57° C., which is the typical flue gas stream temperature. The testing pressures were 1.1 psig for the feed side and 1.0 psig for the sweep side, respectively. The outlet gas compositions of both retentate and permeate streams were analyzed by using a gas chromatograph (GC) equipped with a thermal conductivity detector (TCD) (Agilent Technologies, Palo Alto, Calif.). The SUPELCO Carboxen® 1004 micropacked GC column (Sigma-Aldrich, St. Louis, Mo.) was used for this GC. The gas transport measurement results are listed in Table 6. As listed in this table, $CO_2$ permeability was improved by 24% and $CO_2/N_2$ selectivity was increased by 14% by modifying polyvinylamine into poly(N-methyl-N-vinylamine).

TABLE 6

Comparison of PVAm and poly(N-methyl-N-vinylamine) membrane performances.

|  | $CO_2$ Permeability (Barrer) | $CO_2/N_2$ Selectivity |
| --- | --- | --- |
| PVAm | 213.9 | 48.5 |
| Poly(N-methyl-N-vinylamine) | 264.2 | 55.5 |

Poly(N-isopropyl-N-vinlamine) Membrane Synthesis

The aqueous polyvinylamine solution was adjusted to have a pH of 12.0, which ensured the amino groups of polyvinylamine were all deprotonated to free amino groups. Isopropylbromide and KOH, each at one equivalent amount, were added into the above PVAm solution. The reaction was conducted at 45° C. for 48 hours in a reactor equipped with a cold-water condenser. After the reaction, the solution was cooled down to room temperature and then transferred to the cellulose dialysis tubing, which was sealed at both ends using clips and put in deionized water under stirring for 4 h. The deionized water was refreshed every 15 minutes. Then, the by-product, potassium bromide, was removed completely. The obtained poty(N-isopropyl-N-vinylamine) solution was purged under nitrogen flow (with a flow rate of around 100 cc/min) to possess a good viscosity due to an increased concentration. The viscous poly(N-isopropyl-N-vinylamine) solution was coated onto the PES substrate (pore size: 39 nm) with the polyamine layer thickness of 8-12 μm.

Similarly, the membrane was loaded into a stainless-steel rectangular permeation cell with an effective membrane area of 5.7 cm² inside a temperature-controlled oven (Bemco Inc. Simi Valley, Calif.). A countercurrent flow configuration (with a feed gas flow rate of 98 cc/min and a sweep gas flow rate of 30 cc/min) was applied to offer the maximum driving force across the membrane. The binary gas mixture containing 20% $CO_2$ and 80% $N_2$ (on dry basis) was used as the feed gas, while argon was used as the sweep gas. Both the feed gas and the sweep gas were humidified by each passing through 100 mL water in a 500-mL stainless-steel humidifier (Swagelok, Westerville, Ohio) filled with 60% (by volume) packing of glass Raschig rings, to achieve a water vapor content of about 17% at 57° C. The testing temperature was set to be 57° C., which is the typical flue gas stream temperature. The testing pressures were 1.1 psig for the feed side and 1.0 psig for the sweep side, respectively. The outlet gas compositions of both retentate and permeate streams were analyzed by using a gas chromatograph (GC) equipped with a thermal conductivity detector (TCD) (Agilent Technologies, Palo Alto, Calif.). The SUPELCO Carboxen® 1004 micropacked GC column (Sigma-Aldrich, St. Louis, Mo.) was used for this GC. The gas transport measurement results are listed in Table 7. In comparison with the PVAm results shown in Table 6, the sterically hindered poly(N-isopropyl-N-vinylamine) membrane showed a 15% improvement on $CO_2$ permeability with a comparable $CO_2/N_2$ selectivity.

TABLE 7

Membrane performance of poly(N-isopropyl-N-vinylamine).

| | $CO_2$ Permeability (Barrer) | $CO_2/N_2$ Selectivity |
|---|---|---|
| Poly(N-isopropyl-N-vinylamine) | 245.0 | 47.5 |

Poly(N-tert-butyl-N-vinylamine) Membrane Synthesis

The aqueous polyvinylamine solution was adjusted to have a pH of 12.0, which ensured the amino groups of polyvinylamine were all deprotonated to free amino groups. Tert-butyl-bromide and KOH, each at one equivalent amount, were added into the above PVAm solution. The reaction was conducted at 45° C. for 48 hours in a reactor equipped with a cold-water condenser. After the reaction, the solution was cooled down to room temperature and then transferred to the cellulose dialysis tubing, which was sealed at both ends using clips and put in deionized water under stirring for 4 h. The deionized water was refreshed every 15 minutes. Then, the by-product, potassium bromide, was removed completely. The obtained poly(N-tert-bultyl-N-vinylamine) solution was purged under nitrogen flow (with a flow rate of around 100 cc/min) to possess a good viscosity due to an increased concentration. The viscous poly(N-tert-butyl-N-vinylamine) solution was coated onto the PES substrate (pore size: 39 nm) with the polyamine layer thickness of 8-12 μm.

Similarly, the membrane was loaded into a stainless-steel rectangular permeation cell with an effective membrane area of 5.7 cm² inside a temperature-controlled oven (Bemco Inc. Simi Valley, Calif.). A countercurrent flow configuration (with a feed gas flow rate of 98 cc/min and a sweep gas flow rate of 30 cc/min) was applied to offer the maximum driving force across the membrane. The binary gas mixture containing 20% $CO_2$ and 80% $N_2$ (on dry basis) was used as the feed gas, while argon was used as the sweep gas. Both the feed gas and the sweep gas were humidified by each passing through 100 mL water in a 500-mL stainless-steel humidifier (Swagelok, Westerville, Ohio) filled with 60% (by volume) packing of glass Raschig rings, to achieve a water vapor content of approximately 17% at 57° C. The testing temperature was set to be 57° C., which is the typical flue gas stream temperature. The testing pressures were 1.1 psig for the feed side and 1.0 psig for the sweep side, respectively. The outlet gas compositions of both retentate and permeate streams were analyzed by using a gas chromatograph (GC) equipped with a thermal conductivity detector (TCD) (Agilent Technologies, Palo Alto, Calif.). The SUPELCO Carboxen® 1004 micropacked GC column (Sigma-Aldrich, St. Louis, Mo.) was used for this GC. The gas transport measurement results are listed in Table 8. In comparison with the PVAm results shown in Table 6, the sterically hindered poly(N-tert-butyl-N-vinylamine) membrane showed a 11% improvement on $CO_2$ permeability with a comparable $CO_2/N_2$ selectivity.

TABLE 8

Membrane performance of poly(N-tert-butyl-N-vinylamine)

| | $CO_2$ Permeability (Barrer) | $CO_2/N_2$ Selectivity |
|---|---|---|
| Poly(N-methyl-N-vinylamine) | 237.8 | 48.4 |

REFERENCES

[17] W. S. W. Ho, K. K. Sirkar, Membrane Handbook, Chapman & Hall, New York, 1992; reprint edition, Kluwer Academic Publishers, Boston, 2001.

[18] L. M. Robeson, B. D. Freeman, D. R. Paul, B. W. Rowe, An empirical correlation of gas permeability and permselectivity in polymers and its theoretical basis, J. Membr. Sci. 341 (2009) 178-185.

[19] D. E. Gottschlich, D. L. Roberts, J. D. Way, A theoretical comparison of facilitated transport and solution-diffusion membrane modules for gas separation, Gas Sep, Purif. 2 (1988) 65-71.

[20] Y. Zhao, W. S. W. Ho, Steric hindrance effect on amine demonstrated in solid polymer membranes for $CO_2$ transport, J. Membr. Sci. 415-416 (2012) 132-138.

[21] M. Caplow, Kinetics of carbamate formation and breakdown, J. Am. Chem. Soc. 90 (1968) 6795-6803.

[22] P. V. Danckwerts, The reaction of $CO_2$ with ethanolamines, Chem, Eng. Sci. 34 (1979) 443-446.

[23] G. Sartori, W. S. W. Ho, D. W. Savage, G. R. Chludzinski, S. Wiechert, Sterically-hindered amines for acid-gas absorption, Sep. Purif. Methods 16 (1987) 171-200.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A membrane comprising:
a gas permeable support layer; and
a selective polymer layer disposed on the gas permeable support layer, wherein the selective polymer layer comprises an amine-containing polymer and an amino acid salt dispersed within the amine-containing polymer;
wherein the amine-containing polymer comprises a monomer having the structure below:

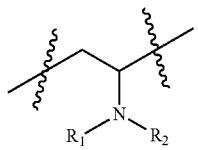

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a heterocyclic ring, with the proviso that at least one of $R_1$ and $R_2$ is not hydrogen.

2. The membrane of claim 1, wherein the gas permeable support layer comprises a gas permeable polymer selected from the group consisting of polyamides, polyimides, polypyrrolones, polyesters, sulfone-based polymers, polymeric organosilicones, fluorinated polymers, polyolefins, copolymers thereof, and blends thereof.

3. The membrane of claim 2, wherein the gas permeable polymer comprises polyethersulfone.

4. The membrane of claim 1, wherein the gas permeable support layer comprises a gas permeable polymer disposed on a base.

5. The membrane of claim 1, wherein the membrane further comprises:
an inorganic layer disposed on the gas permeable support layer.

6. The membrane of claim 5, wherein the inorganic layer comprises a plurality of discreet nanoparticles having an average particle size of less than 1 micron.

7. The membrane of claim 6, wherein the nanoparticles comprise silicate nanoparticles, alumino-silicate nanoparticles, or a combination thereof.

8. The membrane of claim 7, wherein the nanoparticles comprise zeolite Y nanoparticles.

9. The membrane of claim 6, wherein the average particle size of the nanoparticles is from 1 nm to 500 nm.

10. The membrane of claim 1, wherein the membrane exhibits a $CO_2$:$N_2$ selectivity of from 45 to 350 at 57° C. and 1 atm feed pressure.

11. The membrane of claim 1, wherein the membrane exhibits a $CO_2$ permeance of from 100 to 2000 GPU at 57° C. and 1 atm feed pressure.

12. The membrane of claim 1, wherein the amine-containing polymer comprises a sterically hindered derivative of polyvinylamine.

13. The membrane of claim 12, wherein the sterically hindered derivative of polyvinylamine comprises a polymer having the structure below

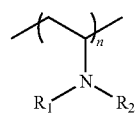

wherein $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a heterocyclic ring, with the proviso that at least one of $R_1$ and $R_2$ is not hydrogen; and n is an integer from 10 to 25,000.

14. The membrane of claim 12, wherein the sterically hindered derivative of polyvinylamine comprises a random copolymer or block copolymer having the structure below

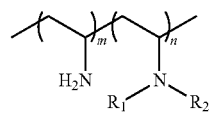

wherein $R_1$ and $R_2$ are, independently for each occurrence, hydrogen, alkyl, alkenyl, alkynyl, aryl, or cycloalkyl, or Ri and R2, together with the nitrogen atom to which they are attached, form a heterocyclic ring, with the proviso that at least one of $R_1$ and $R_2$ is not hydrogen;

m is an integer from 10 to 10,000; and n is an integer from 10 to 10,000.

15. The membrane of claim 1, wherein the amino acid salt comprises a salt of a compound defined by the formula below

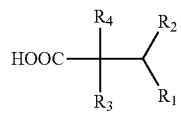

wherein, independently for each occurrence in the amino acid, each of $R_1$, $R_2$, $R_3$ and $R_4$ is selected from one of the following

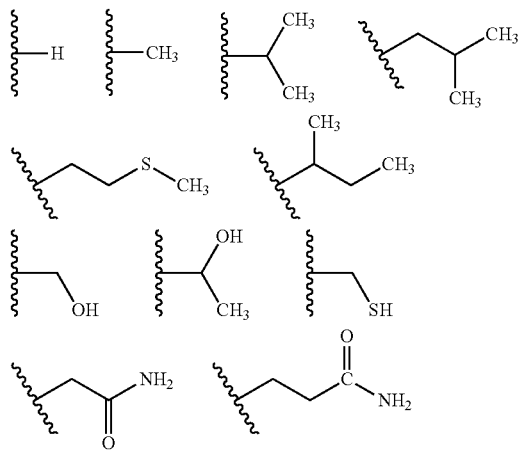

-continued

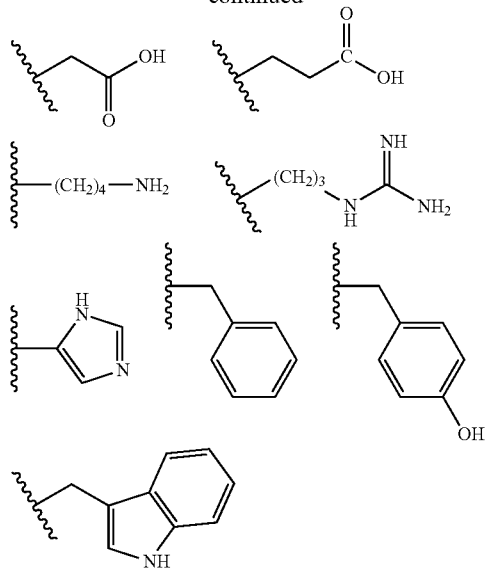

wherein at least one of $R_1$-$R_4$ comprises an amino group, or $R_1$ and $R_3$, together with the atoms to which they are attached, form a five-membered heterocycle defined by the structure below when n is 1, or a six-membered heterocycle defined by the structure below when n is 2

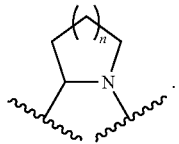

16. The membrane of claim 1, wherein the amino acid salt comprises a glycinate salt or an aminoisobutyrate salt.

17. A method for separating a gaseous mixture comprising a first gas and a second gas, the method comprising contacting a membrane defined by claim 1 with the gaseous mixture under conditions effective to afford transmembrane permeation of the first gas.

18. A method of making a membrane comprising, coating an inorganic layer with a selective polymer, wherein the selective polymer comprises an amine-containing polymer and an amino acid salt dispersed within the amine-containing polymer;
   wherein the amine-containing polymer comprises a monomer having the structure below:

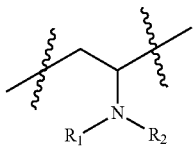

wherein
   $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a heterocyclic ring, with the proviso that at least one of $R_1$ and $R_2$ is not hydrogen.

19. A method of making a membrane comprising,
   depositing a nanoparticle dispersion on a gas permeable support layer to form an inorganic layer disposed on the gas permeable support layer; and
   coating the inorganic layer with a selective polymer, wherein the selective polymer comprises an amine-containing polymer and an amino acid salt dispersed within the amine-containing polymer;
wherein the amine-containing polymer comprises a monomer having the structure below:

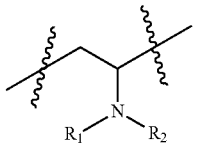

wherein
   $R_1$ and $R_2$ are, independently for each occurrence, hydrogen, alkyl, alkenyl, alkynyl, aryl, or cycloalkyl, or $R_1$ and $R_2$, together with the nitrogen atom to which they are attached, form a heterocyclic ring, with the proviso that at least one of $R_1$ and $R_2$ is not hydrogen.

* * * * *

UNITED STATES PATENT AND TRADEMARK OFFICE
CERTIFICATE OF CORRECTION

PATENT NO. : 10,835,847 B2
APPLICATION NO. : 15/577954
DATED : November 17, 2020
INVENTOR(S) : W. S. Winston Ho et al.

Page 1 of 1

It is certified that error appears in the above-identified patent and that said Letters Patent is hereby corrected as shown below:

In the Claims

In Claim 7, Column 34, Line 28, "Ri" should be changed to -- $R_1$ --.

In Claim 7, Column 34, Line 29, "R2" should be changed to -- $R_2$ --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*